US011902892B2

(12) United States Patent
Huang et al.

(10) Patent No.: US 11,902,892 B2
(45) Date of Patent: Feb. 13, 2024

(54) SYSTEMS AND METHODS FOR PROVIDING ON-DEMAND QUALITY OF SERVICE WITH RADIO ACCESS NETWORK CONTROL

(71) Applicant: Verizon Patent and Licensing Inc., Basking Ridge, NJ (US)

(72) Inventors: Ye Huang, San Ramon, CA (US); Jin Yang, Orinda, CA (US); Sudhakar Reddy Patil, Flower Mound, TX (US); Javier A. Ferro, Somerset, NJ (US); Suzann Hua, Beverly Hills, CA (US); Susan Wu Sanders, Bridgewater, NJ (US); Violeta Cakulev, Milburn, NJ (US); Ali Imdad Malik, East Brunswick, NJ (US); Hossein M. Ahmadi, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 217 days.

(21) Appl. No.: 17/644,125

(22) Filed: Dec. 14, 2021

(65) Prior Publication Data
US 2023/0189131 A1 Jun. 15, 2023

(51) Int. Cl.
*H04W 48/18* (2009.01)
*H04W 28/02* (2009.01)

(52) U.S. Cl.
CPC ....... *H04W 48/18* (2013.01); *H04W 28/0268* (2013.01)

(58) Field of Classification Search
None
See application file for complete search history.

(56) References Cited

U.S. PATENT DOCUMENTS

| | | | | |
|---|---|---|---|---|
| 9,065,739 | B2* | 6/2015 | Cheng | H04W 28/16 |
| 11,184,953 | B2* | 11/2021 | Panchal | H04W 76/27 |
| 11,622,293 | B2* | 4/2023 | Gupta | H04L 41/5054 |
| | | | | 370/235 |
| 2016/0249372 | A1* | 8/2016 | Paredes Cabrera | H04L 47/74 |
| 2018/0007493 | A1* | 1/2018 | Yang | H04W 4/70 |
| 2018/0262913 | A1* | 9/2018 | Ravishankar | H04W 60/00 |

(Continued)

FOREIGN PATENT DOCUMENTS

WO    WO2021176092    *    9/2021

OTHER PUBLICATIONS

Rothbaum, Network Sharing and Slicing for Railway (May 7, 2018) (Year: 2018).*

(Continued)

*Primary Examiner* — Andre Tacdiran

(57) ABSTRACT

A network device of a core network may maintain a mapping table that maps core network slices with quality of service (QoS) class identifiers (QCIs) based on service profile identifiers (SPIDs), and may receive, from a user device, a request for service with a particular QCI included in the QCIs of the mapping table. The network device may identify a particular SPID of the SPIDs in the mapping table based on the particular QCI of the service, and may generate a flow request based on the particular SPID. The network device may cause the flow request to be provided to a radio access network (RAN) associated with the user device, to cause the RAN to select a RAN slice for provision of the service to the user device.

20 Claims, 12 Drawing Sheets

(56) References Cited

U.S. PATENT DOCUMENTS

| | | | |
|---|---|---|---|
| 2020/0221369 A1* | 7/2020 | Adjakple | H04W 48/18 |
| 2021/0136870 A1* | 5/2021 | Panchal | H04L 67/52 |
| 2023/0051495 A1* | 2/2023 | Yang | H04W 48/16 |

OTHER PUBLICATIONS

D. T. Hoang, D. Niyato, P. Wang, A. De Domenico and E. C. Strinati, "Optimal Cross Slice Orchestration for 5G Mobile Services," 2018 IEEE 88th Vehicular Technology Conference (VTC-Fall), Chicago, IL, USA, 2018, pp. 1-5, doi: 10.1109/VTCFall.2018.8690608 (Year: 2018).*

* cited by examiner

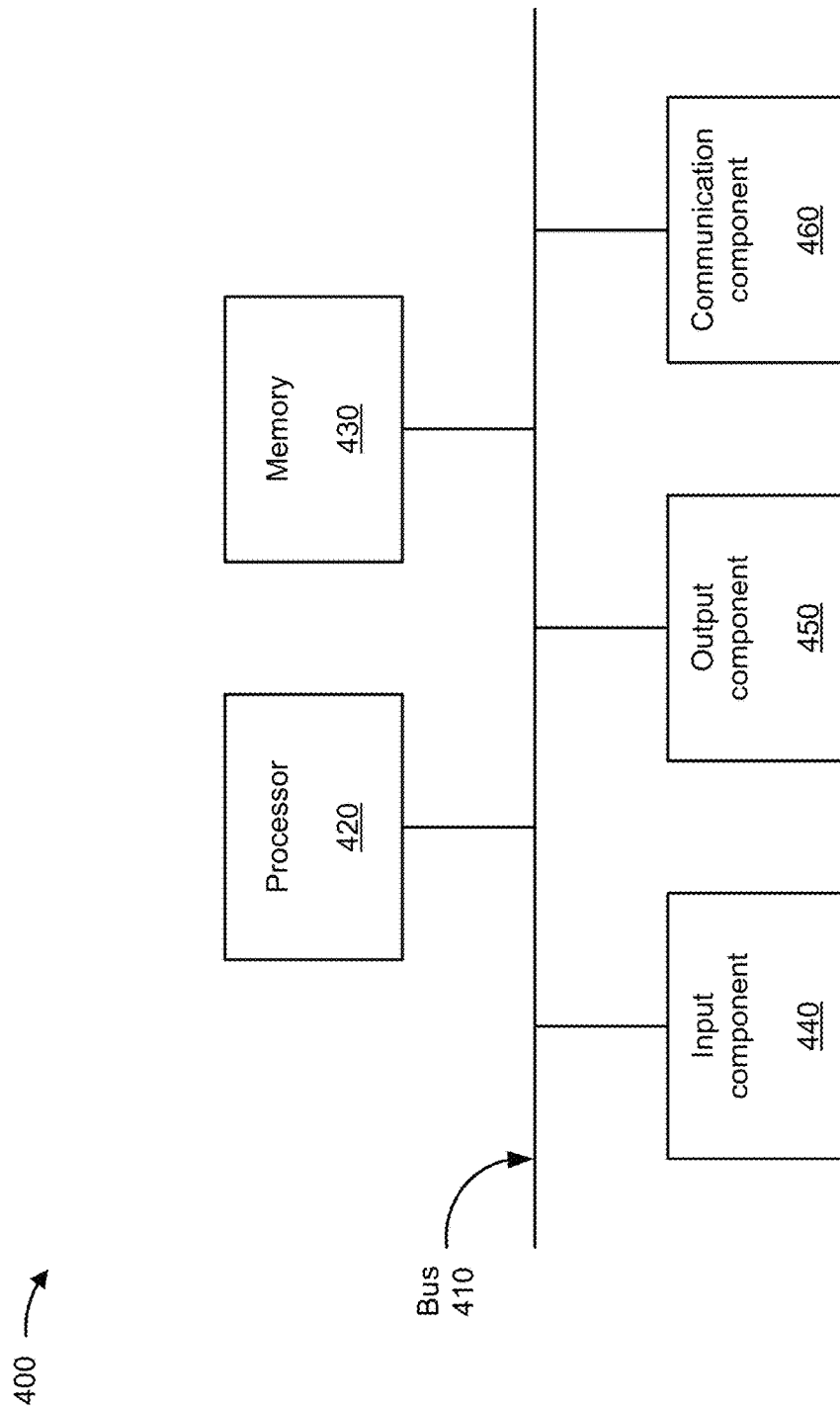

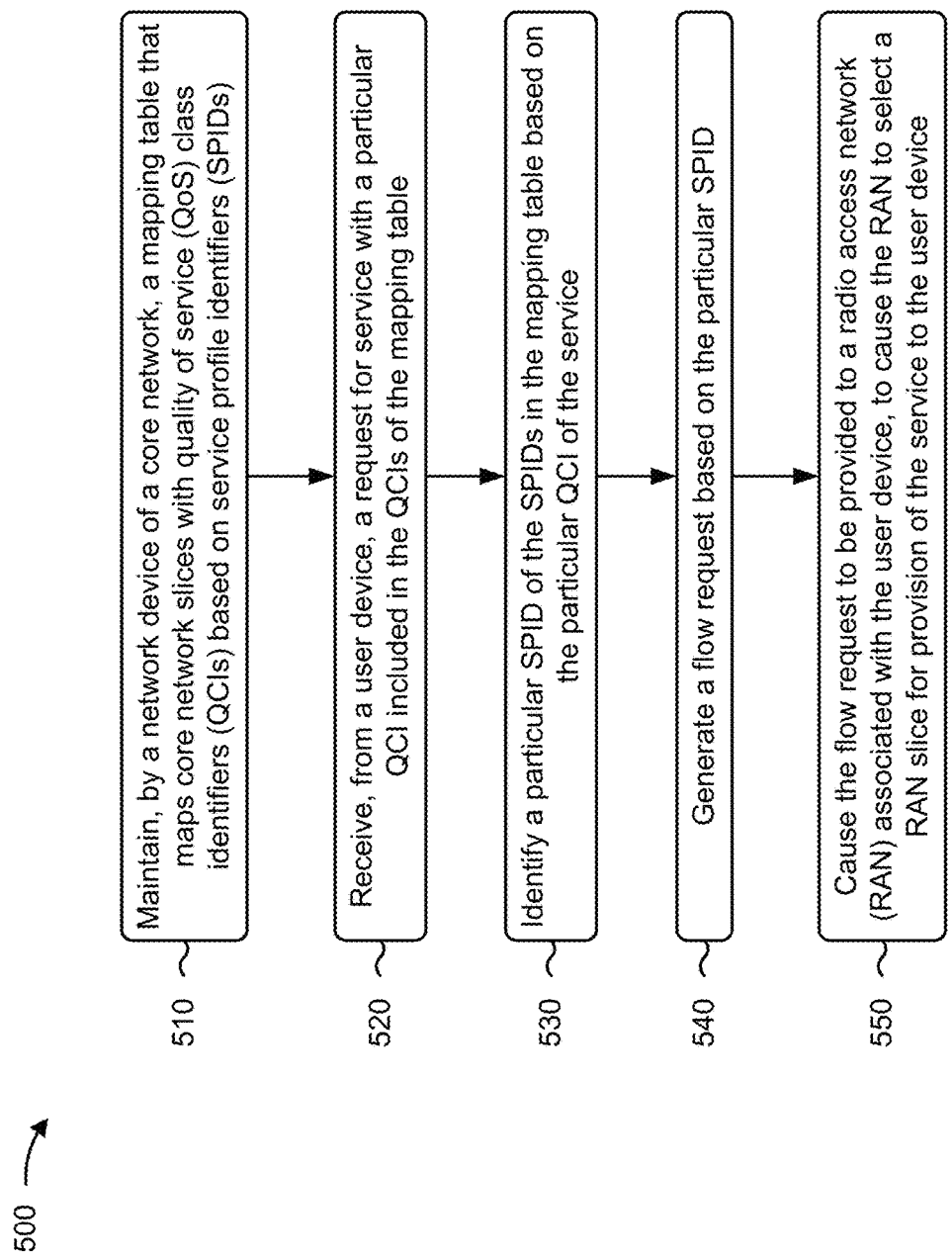

SYSTEMS AND METHODS FOR PROVIDING ON-DEMAND QUALITY OF SERVICE WITH RADIO ACCESS NETWORK CONTROL

BACKGROUND

A radio access network (RAN) (e.g., a fourth generation (4G) RAN or a fifth generation (5G) network RAN) is part of a mobile telecommunication system that implements a radio access technology.

BRIEF DESCRIPTION OF THE DRAWINGS

FIG. 4 is a diagram of example components of one or more devices of FIGS. 2 and 3.

FIG. 5 is a flowchart of an example process for providing on-demand QoS with RAN control.

DETAILED DESCRIPTION OF EXAMPLE EMBODIMENTS

Figure 1A:
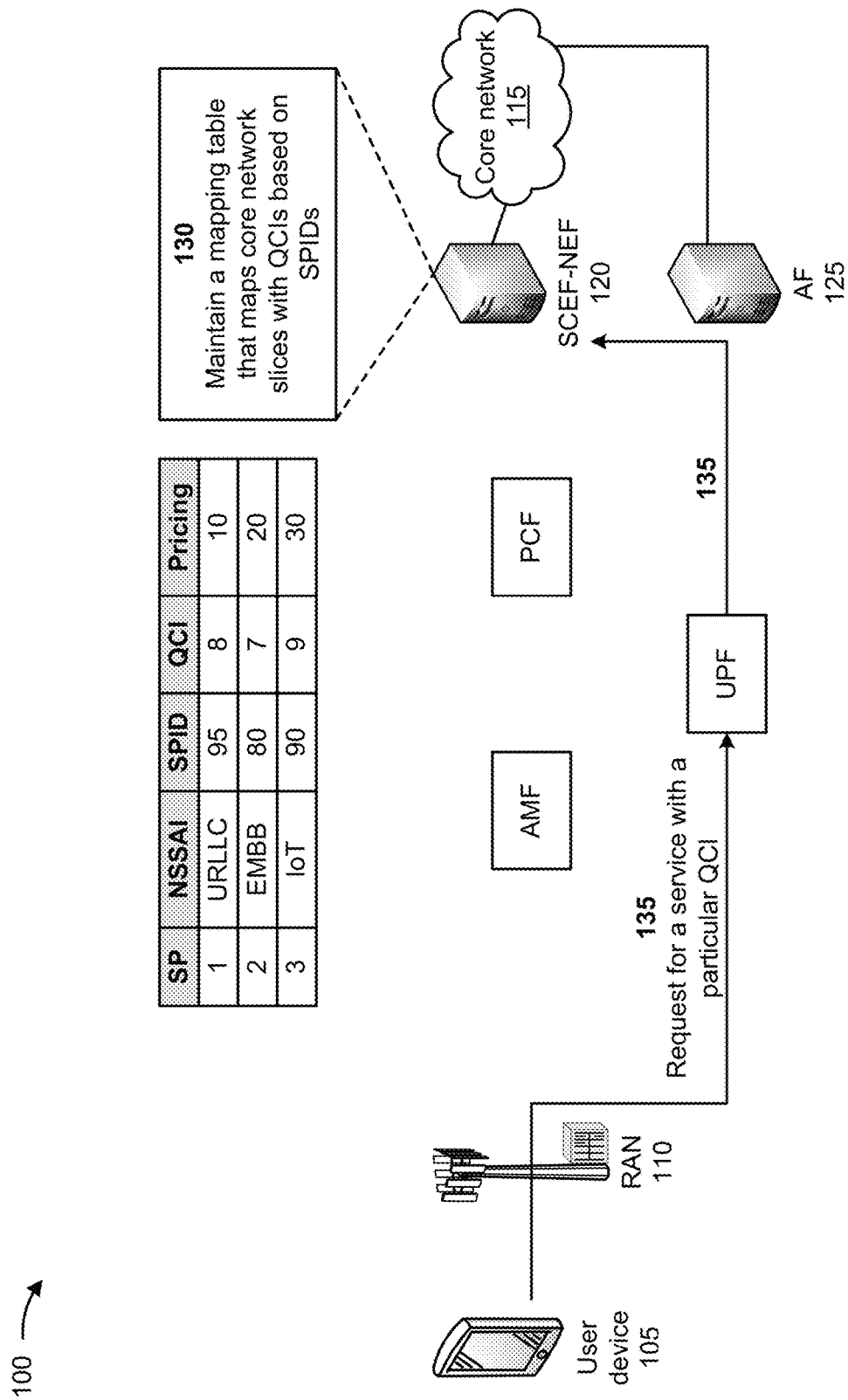
FIGS. 1A-1H are diagrams of an example associated with providing on-demand quality of service (QoS) with RAN control.

The following detailed description of example implementations refers to the accompanying drawings. The same reference numbers in different drawings may identify the same or similar elements.

Currently, radio access network (RAN) resources for RAN slices are separately managed with no direct connection with core network slices. A service profile identifier (SPID) may be utilized to identify RAN slices, especially in a 5G Non-standalone (NSA) network with a 4G core network. A SPID is a number issued by network service providers that identifies services and features of a RAN. A RAN may utilize a SPID that is statically configured for a group of user devices per access point name (APN) and requires subscriber provisioning. However, current on-demand, end-to-end dedicated quality of service (QoS) flow creation signaling for a user device fails to utilize a RAN slice identifier (e.g., since the SPID value is statically provisioned on the RAN) and a user device identifier (e.g., an international mobile subscriber identity (IMSI) a subscription permanent identifier (SUFI), and/or the like). Thus, the RAN is unable to allocate RAN slices that correlate with core network slices providing a particular QoS. Thus, current mechanisms for providing a particular QoS to a user device consume computing resources (e.g., processing resources, memory resources, communication resources, and/or the like), networking resources, and/or other resources associated with providing a poor QoS for a user device, inefficiently utilizing RAN resources to provide a service to a user device, inefficiently utilizing core network slices to provide a service to a user device, and/or the like.

Some implementations described herein provide a network device (e.g., a service capabilities exposure function (SCEF) in 4G networks or a network exposure function (NEF) in 5G networks) that provides on-demand QoS with RAN control. For example, the SCEF-NEF may maintain a mapping table that maps core network slices, of a core network, with QoS class identifiers (QCIs) based on SPIDs, and may receive, from a user device, a request for service with a particular QCI included in the QCIs of the mapping table. The SCEF-NEF may identify a particular SPID of the SPIDs in the mapping table based on the particular QCI of the service, and may generate a flow request based on the particular SPID. The SCEF-NEF may cause the flow request to be provided to a RAN associated with the user device, to cause the RAN to select a RAN slice for provision of the service to the user device. In another example, the SCEF-NEF may receive, from the user device, another request for another service with another QCI, and may generate a modified SPID based on the other QCI of the other request and based on the mapping table. The SCEF-NEF may maintain a validity time period for the modified SPID, and may cause the modified SPID to be provided to the RAN of the user device for a duration of the validity time period, where the modified SPID causes the RAN to select another RAN slice for provision of the other service to the user device.

In this way, the SCEF-NEF provides on-demand QoS with RAN control. For example, the SCEF-NEF may enable a linkage between core network slices and RAN slices so that a particular QoS (e.g., a QoS class identifier (QCI)) may be applied to a service provided to a user device. The SCEF-NEF may enable the linkage between the core network slices and the RAN slices in real time or near-real time and without modifying existing signal procedures between the core network and the RAN. The SCEF-NEF may provide, to the RAN, information identifying core network slices, and SPIDs and QCIs associated with the core network slices, so that the RAN may map the RAN slices to the core network slices. The RAN may process user device traffic flows, with a SPID, on-demand, and may release RAN resources as soon as a session is terminated for the traffic flows. Thus, the SCEF-NEF may conserve computing resources, networking resources, and/or other resources associated with providing a poor QoS for a user device, inefficiently utilizing RAN resources to provide a service to a user device, inefficiently utilizing core network slices to provide a service to a user device, and/or the like.

FIGS. 1A-1H are diagrams of an example 100 associated with providing on-demand QoS with RAN control. As shown in FIGS. 1A-1H, example 100 includes a user device 105, a RAN 110, a core network 115, an SCEF-NEF 120 (sometimes referred to as SCEF 120 or NEF 120), an application function (AF) 125, a policy control function (PCF), an access and mobility management function (AMF), and a user plane function (UPF). Further details of the user device 105, the RAN 110, the core network 115, the SCEF-NEF 120, the AF 125, the PCF, the AMF, and the UPF are provided elsewhere herein. Although implementations describe the core network 115 in connection with a 5G core network, the implementations may also be utilized with a 4G core network (e.g., a 5G NSA network with a 4G core network).

As shown in FIG. 1A, and by reference number 130, the SCEF-NEF 120 may maintain a mapping table that maps core network slices with QCIs based on SPIDs. For example, the mapping table may include a service profile field, a network slice selection assistance information (NSSAI) field, a SPID field, a QCI field, a pricing field, and/or the like. The service profile field may include a plurality of service profile entries (e.g., identifiers, such as one, two, three, and/or the like) associated with services provided by the core network slices identified in the NSSAI field. The NSSAI field may include a plurality of NSSAI entries associated with the services provided by the core network slices of the core network 115. The services may include an ultra-reliable low latency communications (URLLC) service that supports dense sensor grids of Internet of Things (IoT)

endpoints in the areas of manufacturing, energy transmission, transportation, and healthcare; an enhanced mobile broadband (eMBB or EMBB) service that provides greater data bandwidth and latency improvements for augmented reality applications, virtual reality applications, ultra-high definition three-hundred and sixty degree streaming video, and/or the like; an IoT service (e.g., a massive machine type communications service), and/or the like. The SPID field may include a plurality of SPID entries that identify RAN slices of the RAN 110 to utilize with the services provided by the core network slices identified in the NSSAI field. For example, the SPID entries may include values, such as eighty, ninety, ninety-five, and/or the like. The QCI field may include a plurality of QCI entries that identify QCIs to be provided by the core network slices identified in the NSSAI field and by the RAN slices identified in the SPID field. For example, the QCI entries may include values, such as seven, eight, nine, and/or the like. The pricing field with a plurality of price entries that identify prices to be charged for the services provided by the core network slices identified in the NSSAI field.

In some implementations, the SCEF-NEF 120 may store the mapping table in a data structure (e.g., a database, a table, a list, and/or the like) associated with the SCEF-NEF 120. In some implementations, the SCEF-NEF 120 may share the mapping table with the PCF (e.g., via an Rx/N5 application programming interface (API)). The mapping table may include the service (e.g., QoS) profiles available to customers, with pricing tied to each service profile, for on-demand QoS traffic flow creation. The user device 105 may be authorized and charged for the created QoS traffic flow that the RAN 110 will support.

As further shown in FIG. 1A, and by reference number 135, the user device 105 may generate a request for a service with a particular QCI. For example, a user may utilize the user device 105 to generate the request for the service with the particular QCI. The service may include a URLLC service, an EMBB service, an IoT service (e.g., a massive machine type communications service), and/or the like. The particular QCI may include a QCI value (e.g., which indicates a particular QoS) associated with the service, such as seven, eight, nine, and/or the like. As further shown in FIG. 1A, the user device 105 may provide the request for the service to the RAN 110, and the RAN 110 may forward the request for the service to the UPF. The UPF may forward the request for the service to the AF, and the AF may forward the request for the service to the SCEF-NEF 120. The SCEF-NEF 120 may receive the request for the service from the AF.

Figure 1B:
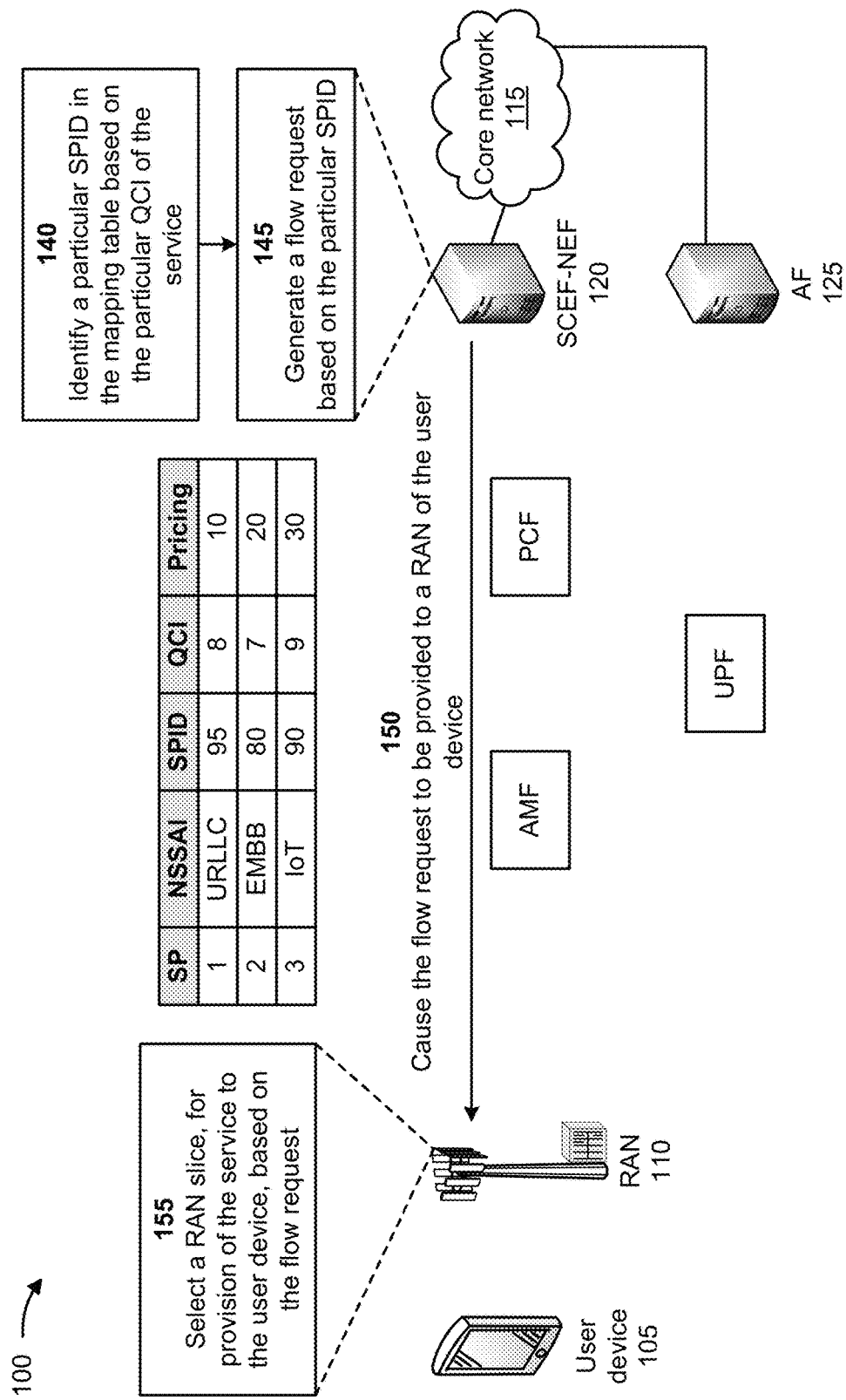

As shown in FIG. 1B, and by reference number 140, the SCEF-NEF 120 may identify a particular SPID in the mapping table based on the particular QCI of the service. For example, the SCEF-NEF 120 may identify the particular QCI in the QCIs of the QCI field of the mapping table, and may identify, as the particular SPID, a SPID in the SPID field that correlates with the particular QCI. In one example, if the particular QCI of the service is eight (8), the SCEF-NEF 120 may determine that the particular SPID is ninety-five (95). In such an example, the particular QCI may also correlate with a first service profile in the service profile field, an NSSAI of URLLC in the NSSAI field, and a price of ten (e.g., $10.00) in the pricing field.

As further shown in FIG. 1B, and by reference number 145, the SCEF-NEF 120 may generate a flow request based on the particular SPID. For example, the SCEF-NEF 120 may generate a flow request that enables provision of the service at the particular QCI to the user device 105, and may insert the particular SPID in the flow request. In some implementations, the flow request may include an identifier of the user device 105 (e.g., an IMSI, a SUPI, and/or the like), the particular SPID (e.g., 80, 90, 95, and/or the like), an identifier of the service (e.g., URLLC, EMBB, and/or the like), and the particular QCI (e.g., 7, 8, 9, and/or the like) of the service.

As further shown in FIG. 1B, and by reference number 150, the SCEF-NEF 120 may cause the flow request to be provided to the RAN 110 of the user device 105. For example, the SCEF-NEF 120 may provide the flow request to the PCF, and the PCF may create a packet data unit (PDU) session create message based on the flow request and the information included in the flow request. The PCF may provide the flow request (e.g., the PDU session create message) to the AMF, and the AMF may forward the flow request to the RAN 110. The RAN 110 may receive the flow request from the AMF.

As further shown in FIG. 1B, and by reference number 155, the RAN 110 may select a RAN slice, for provision of the service to the user device 105, based on the flow request. For example, the RAN 110 may select the RAN slice based on the particular SPID provided in the flow request so that the RAN slice may correlate with the one or more core network slices of the core network 115 being utilized to provide the service. The RAN 110 may utilize the SPID to identify the core network slice(s) of the core network 115 and may select the RAN slice to match the identified core network slice(s). In this way, the RAN 110 may provide the service to the user device 105 at the particular QCI. In some implementations, the flow request may cause the RAN 110 to handle a traffic flow (e.g., associated with the service) from the user device 105 with the RAN slice and to release the RAN slice when a session with the user device 105 is terminated.

Figure 1C:
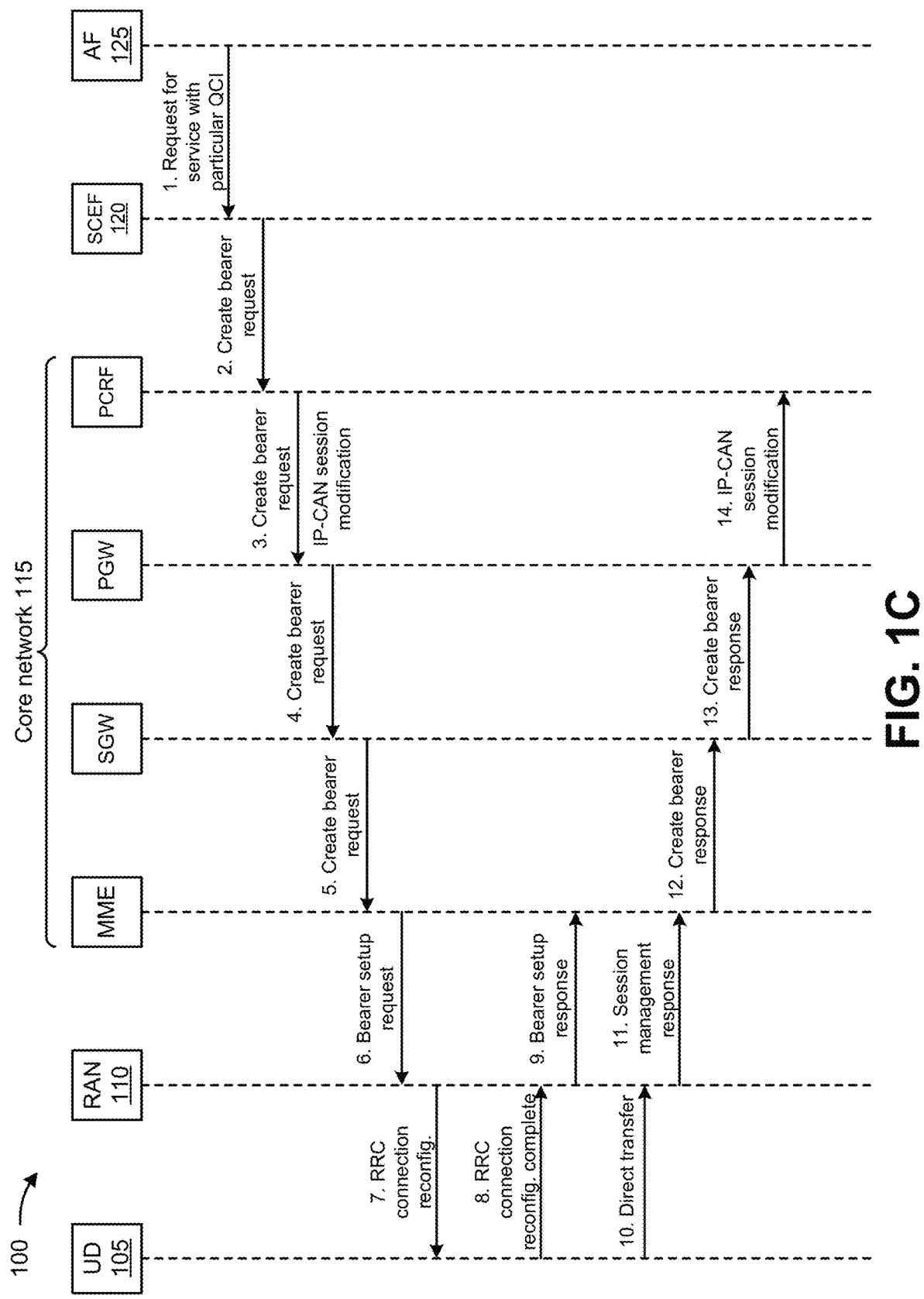

FIG. 1C depicts a call flow for performing the functionality described above in connection with FIGS. 1A and 1B, but with network elements of a 4G network. As shown at step 1, the SCEF 120 may receive a request for a service with a particular QCI from the AF 125. For example, the user device 105 may generate the request for the service with the particular QCI. The service may include a URLLC service, an EMBB service, an IoT service, and/or the like. The particular QCI may include a QCI value (e.g., which indicates a particular QoS) associated with the service, such as seven, eight, nine, and/or the like. The user device 105 may provide the request for the service to the RAN 110, and the RAN 110 may forward the request for the service to a packet data network gateway (PGW) of the core network 115. The PGW may forward the request for the service to the AF 125, and the AF 125 may forward the request for the service to the SCEF 120. The SCEF 120 may receive the request for the service from the AF.

As shown at step 2 of FIG. 1C, the SCEF 120 may generate a create bearer request message based on the request for the service and may provide the create bearer request message to a policy and charging rules function (PCRF). For example, the SCEF 120 may identify a particular SPID in the mapping table based on the particular QCI of the service. The SCEF 120 may identify the particular QCI in the QCIs of the QCI field of the mapping table, and may identify, as the particular SPID, a SPID in the SPID field that correlates with the particular QCI. The SCEF 120 may generate the create bearer request message based on the particular SPID. For example, the SCEF 120 may generate a create bearer request message that enables provision of the service at the particular QCI to the user device 105, and may insert the particular SPID in the create bearer request message. In some implementations, the create bearer request message may include the particular SPID, an identifier (e.g., an IMSI, a SUFI, and/or the like) of the user device 105, a procedure transaction identity, the particular QCI of the service, a maximum packet loss rate for uplink and downlink traffic, a traffic flow template, a linked evolved packet system (EPS) bearer identity, protocol configuration options, and/or the like.

As shown at step 3 of FIG. 1C, the PCRF may provide the create bearer request message to the PGW. For example, the PCRF may provide the create bearer request message to the PGW via an Internet protocol (IP)-connectivity access network (CAN) session modification. As shown at steps 4 and 5 of FIG. 1C, the PGW may forward the create bearer request message to a serving gateway (SGW) and the SGW may forward the create bearer request message to a mobility management entity (MME).

The MME may generate a bearer setup request message (e.g., a session management request) based on the create bearer request message. As shown at step 6 of FIG. 1C, the MME may provide the bearer setup request message to the RAN 110. The RAN 110 may generate a radio resource control (RRC) connection reconfiguration message based on the bearer setup request message. As shown at step 7 of FIG. 1C, the RAN 110 may provide the RRC connection reconfiguration message to the user device 105. The user device 105 may complete the RRC connection reconfiguration based on the RRC connection reconfiguration message, and may generate an RRC connection reconfiguration complete message. As shown at step 8 of FIG. 1C, the user device 105 may provide the RRC connection reconfiguration complete message to the RAN 110.

The RAN 110 may generate a bearer setup response message based on receiving the RRC connection reconfiguration complete message. As shown at step 9 of FIG. 1C, the RAN 110 may provide the bearer setup response message to the MME. As shown at step 10 of FIG. 1C, the user device 105 may provide a direct transfer of the session to the RAN 110. The RAN 110 may generate a session management response based on the direct transfer. As shown at step 11 of FIG. 1C, the RAN 110 may provide the session management response to the MME. The MME may generate a create bearer response message based on the bearer setup response message and the session management response. As shown at steps 12 and 13 of FIG. 1C, the MME may provide the create bearer response message to the SGW and the SGW may forward the create bearer response message to the PGW. The PGW may generate an IP-CAN session modification complete message based on the create bearer response message. As shown at step 14 of FIG. 1C, the PGW may provide the IP-CAN session modification complete message to the PCRF.

In some implementations, the RAN 110 may select a RAN slice, for provision of the service to the user device 105, based on the bearer setup request message. For example, the RAN 110 may select the RAN slice based on the particular SPID provided in the flow request so that the RAN slice may correlate with the one or more core network slices of the core network 115 being utilized to provide the service. The RAN 110 may utilize the SPID to identify the core network slice(s) of the core network 115 and may select the RAN slice to match the identified core network slice(s). In this way, the RAN 110 may provide the service to the user device 105 at the particular QCI. In some implementations, the bearer setup request message may cause the RAN 110 to handle a traffic flow (e.g., associated with the service) from the user device 105 with the RAN slice and to release the RAN slice when a session with the user device 105 is terminated.

Figure 1D:
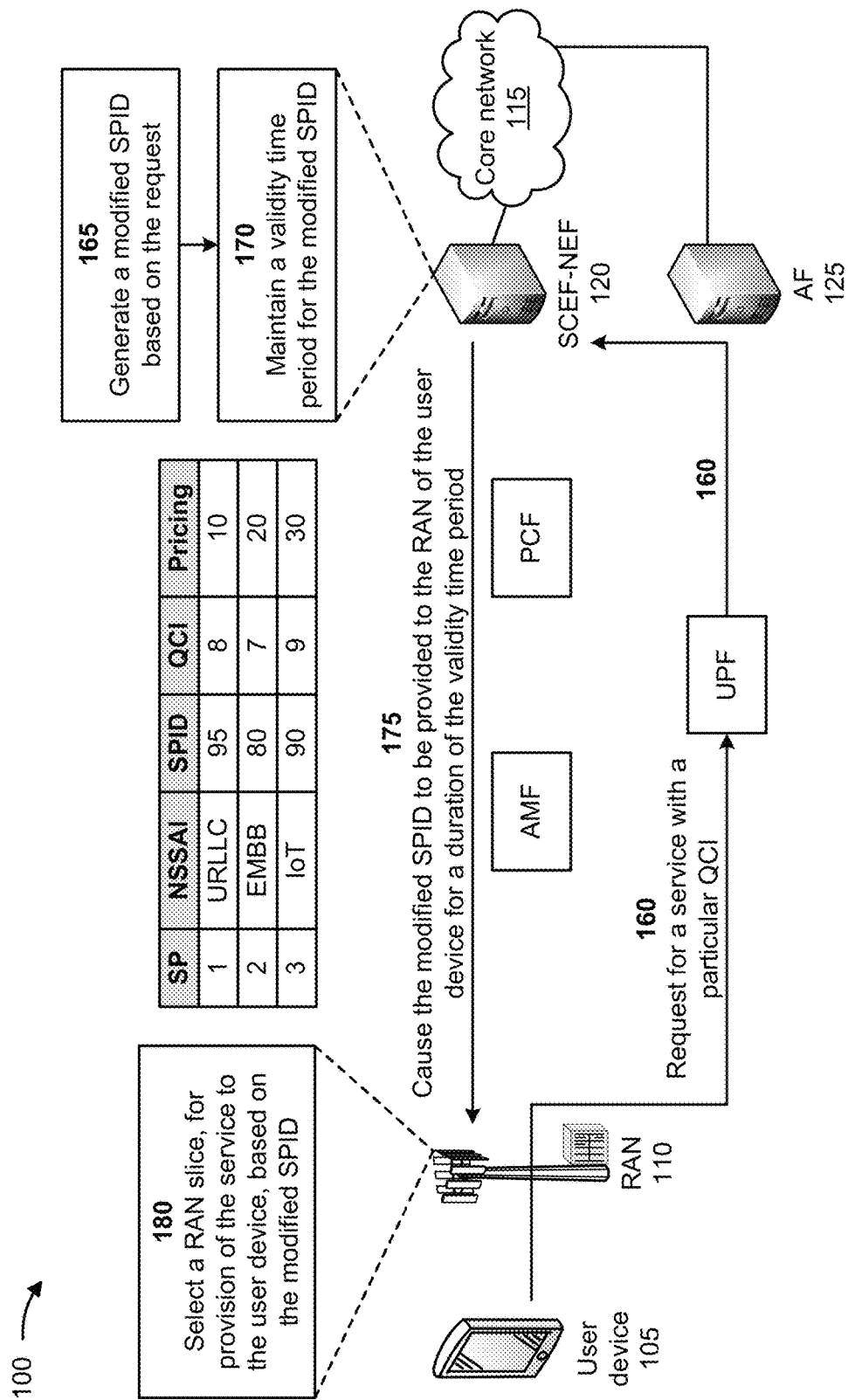

As shown in FIG. 1D, the SCEF-NEF 120 may maintain the mapping table that maps core network slices with QCIs based on SPIDs, as described above in connection with FIG. 1A. In some implementations, the SCEF-NEF 120 may store the mapping table in a data structure associated with the SCEF-NEF 120, and/or may share the mapping table with the PCF (e.g., via an Rx/N5 API).

As further shown in FIG. 1D, and by reference number 160, the user device 105 may generate a request for a service with a particular QCI. For example, a user may utilize the user device 105 to generate the request for the service with the particular QCI. The service may include a URLLC service, an EMBB service, an IoT service (e.g., a massive machine type communications service), and/or the like. The particular QCI may include a QCI value (e.g., which indicates a particular QoS associated with the service, such as seven, eight, nine, and/or the like. As further shown in FIG. 1D, the user device 105 may provide the request for the service to the RAN 110, and the RAN 110 may forward the request for the service to the UPF. The UPF may forward the request for the service to the AF, and the AF may forward the request for the service to the SCEF-NEF 120. The SCEF-NEF 120 may receive the request for the service from the AF.

As further shown in FIG. 1D, and by reference number 165, the SCEF-NEF 120 may generate a modified SPID based on the request (e.g., a SPID that matches a SPID in the mapping table based on the particular QCI of the service). For example, the SCEF-NEF 120 may identify the particular QCI in the QCIs of the QCI field of the mapping table, and may generate, as the modified SPID, a SPID in the SPID field that correlates with the particular QCI. In one example, if the particular QCI of the service is eight (7), the SCEF-NEF 120 may generate a modified SPID is eighty (80). In such an example, the particular QCI may also correlate with a second service profile in the service profile field, an NSSAI of EMBB in the NSSAI field, and a price of twenty (e.g., $20.00) in the pricing field.

As further shown in FIG. 1D, and by reference number 170, the SCEF-NEF 120 may maintain a validity time period. For example, the validity time period may specify a time period for the modified SPID to be valid for the service for the user device 105. As further shown in FIG. 1D, and by reference number 175, the SCEF-NEF 120 may cause the modified SPID to be provided to the RAN 110 of the user device 105 for the duration of the validity time period. For example, the SCEF-NEF 120 may provide the modified SPID to the PCF, and the PCF may provide the modified SPID to the AMF. The AMF may forward the modified SPID to the RAN 110, and the RAN 110 may receive the modified SPID from the AMF.

As further shown in FIG. 1D, and by reference number 180, the RAN 110 may select a RAN slice, for provision of the service to the user device 105, based on the modified SPID. For example, the RAN 110 may select the RAN slice based on the modified SPID so that the RAN slice may correlate with the one or more core network slices of the core network 115 being utilized to provide the service. The RAN 110 may utilize the modified SPID to identify the core network slice(s) of the core network 115 and may select the RAN slice to match the identified core network slice(s). In this way, the RAN 110 may provide the service to the user device 105 at the particular QCI. In some implementations, the modified SPID may cause the RAN 110 to handle a traffic flow (e.g., associated with the service) from the user device 105 with the RAN slice and to release the RAN slice when a session with the user device 105 is terminated. In some implementations, the SCEF-NEF 120 may determine that the duration of the validity time period has expired after causing the modified SPID to be provided to the RAN 110. In such implementations, the SCEF-NEF 120 may cause the modified SPID to be removed from the RAN 110 based on expiration of the duration of the validity time period.

Figure 1E:
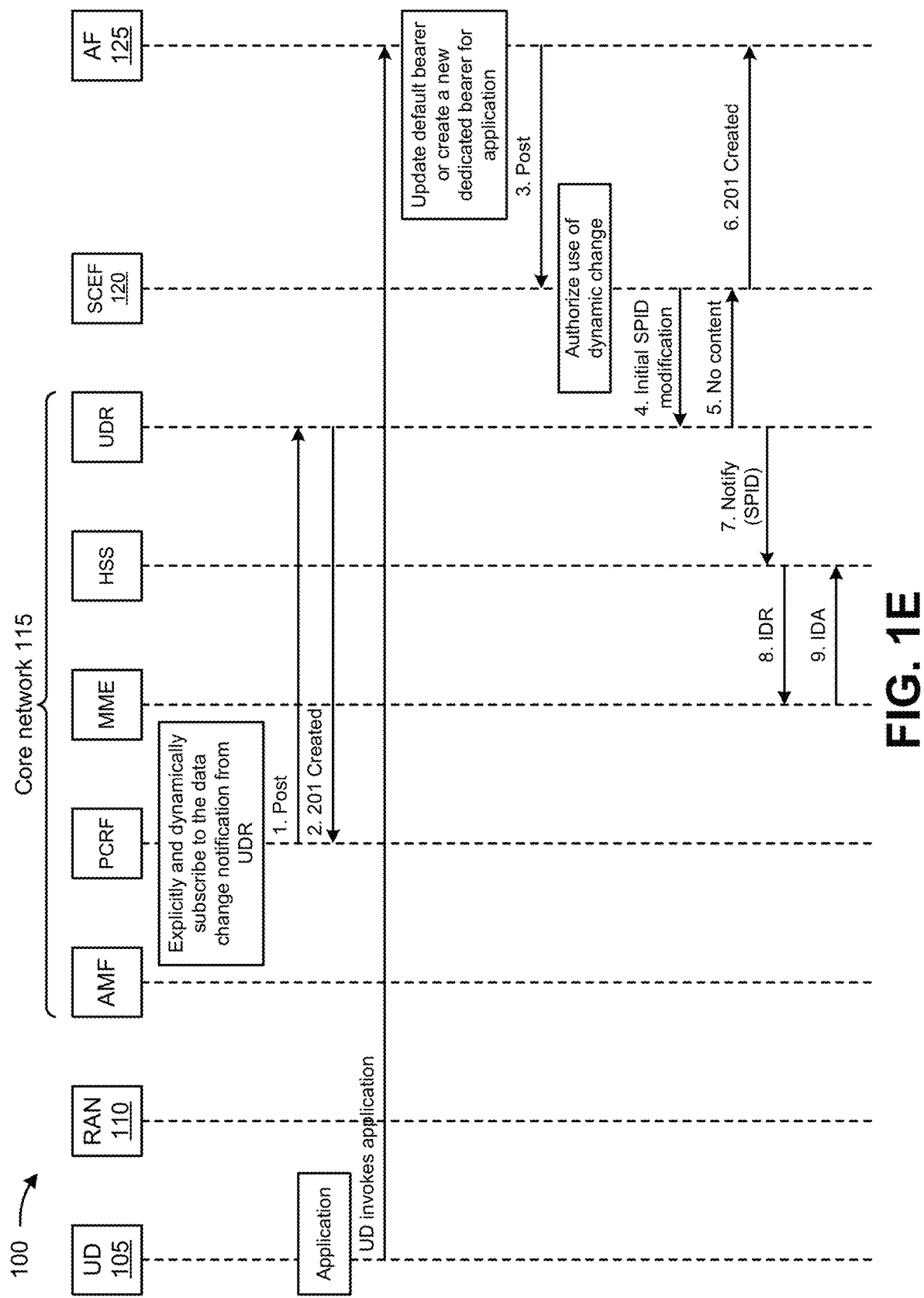
Figure 1F:
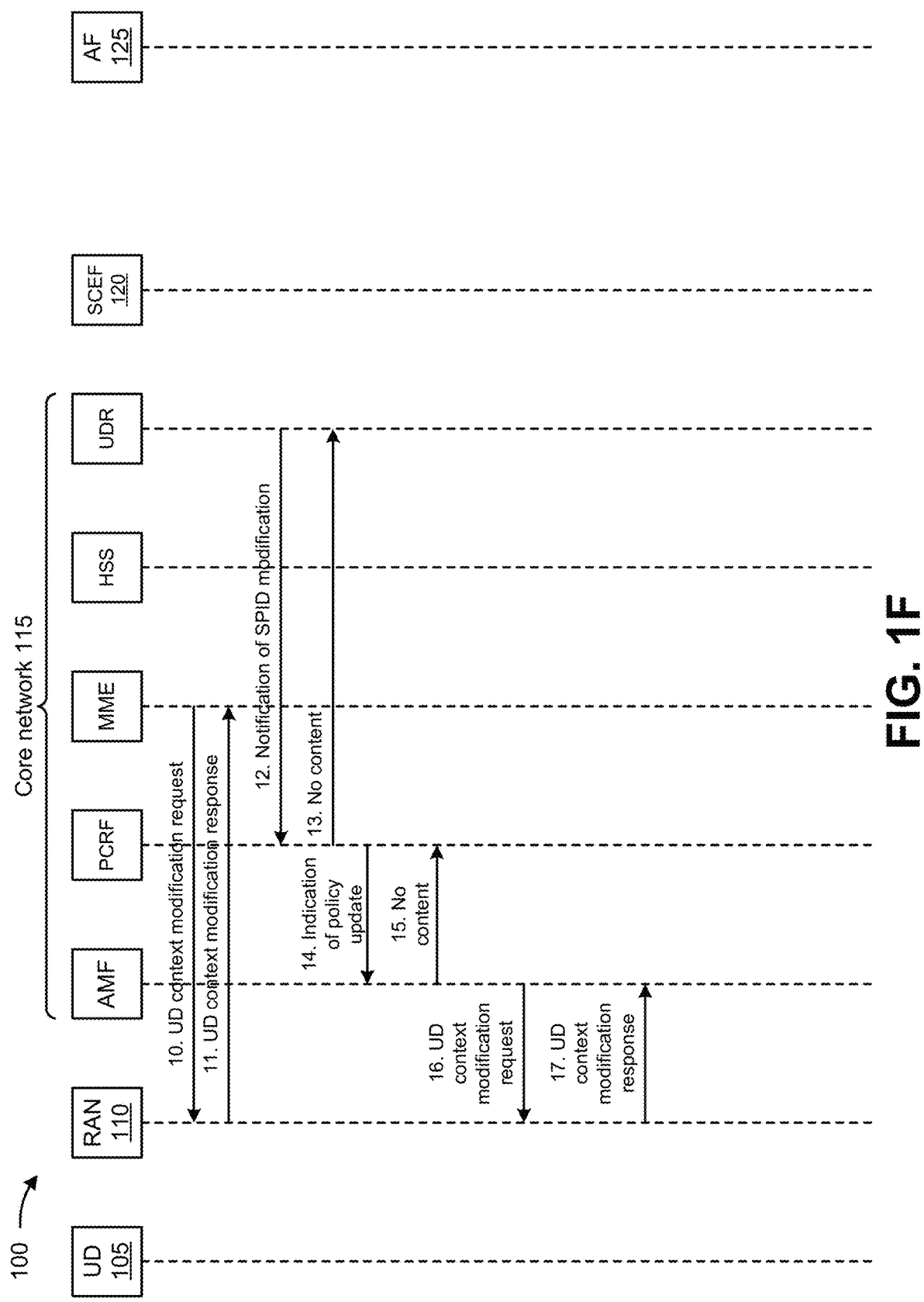
Figure 1G:
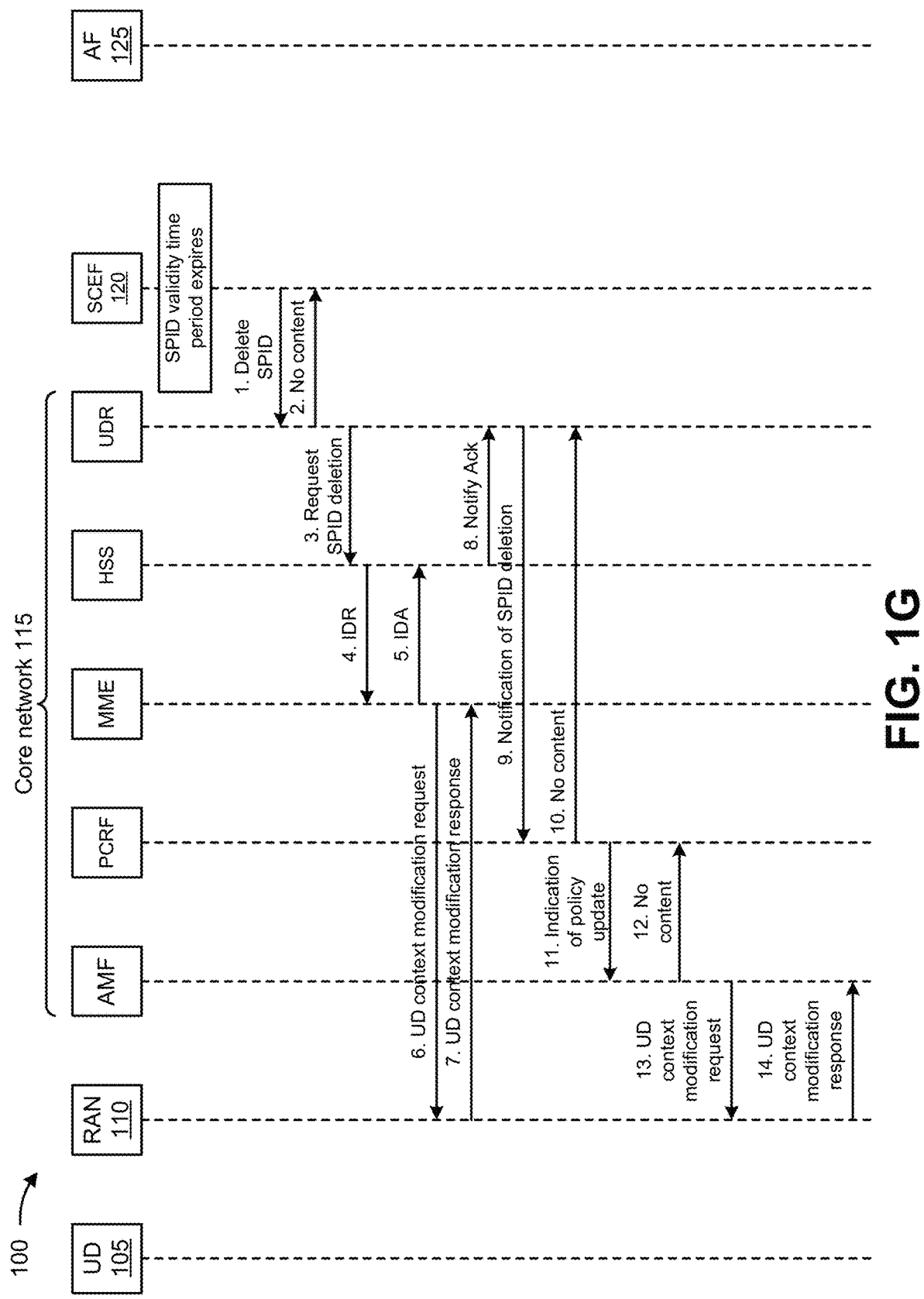

FIGS. 1E-1G depict a call flow for performing the functionality described above in connection with FIG. 1D, but with network elements of a 4G network. As shown in FIG. 1E, a PCRF of the core network 115 may explicitly and dynamically subscribe to a data change notification from a uniform data repository (UDR) of the core network 115. As shown at step 1 of FIG. 1E, the PCRF may provide a subscription request for the data change notification to the UDR. The UDR may generate a subscription for the data change notification, for the PCRF, based on the subscription request. As shown at step 2 of FIG. 1E, the UDR may provide, to the PCRF, an indication that the subscription request for the data change notification is created.

As further shown in FIG. 1E, the user device 105 may invoke an application that is to utilize a service with a particular QCI. When the user device 105 invokes the application, the AF may receive a request for the service with the particular QCI from the user device 105. The AF may update a default bearer for the user device 105 and the application or may create a new dedicated bearer for the application when the user device 105 invokes the application. As shown at step 3 of FIG. 1E, the AF may notify the SCEF 120 of the updated default bearer or the new dedicated bearer. The SCEF 120 may authorize use of the dynamic data change based on being notified of the updated default bearer or the new dedicated bearer. The SCEF 120 may generate a modified SPID for the application.

As shown at steps 4 and 5 of FIG. 1E, the SCEF 120 may provide the modified SPID to the UDR, and the UDR may acknowledge receipt of the modified SPID. As shown at step 6 of FIG. 1E, the SCEF 120 may notify the AF that the modified SPID has been created. As shown at step 7 of FIG. 1E, the UDR may provide the modified SPID to a home subscriber server (HSS) of the core network 115 via notify message. The HSS may generate an insert subscription data request (IDR) based on the modified SPID. As shown at step 8 of FIG. 1E, the HSS may provide the IDR to the MME. The MME may generate an insert subscription data answer (IDA) (e.g., with subscription data) based on the IDR. As shown at step 9 of FIG. 1E, the MME may provide the IDA to the HSS.

The MME may generate a user device (UD) context modification request, that includes the modified SPID, based on the IDR. As shown at step 10 of FIG. 1F, the MME may provide the UD context modification request to the RAN 110. The RAN 110 may generate a UD context modification response based on the UD context modification request. As shown at step 11 of FIG. 1F, the RAN 110 may provide the UD context modification response to the MME. The UD context modification response may indicate that the RAN 110 is utilizing the modified SPID.

In some implementations, the RAN 110 may select a RAN slice, for provision of the service to the user device 105, based on the modified SPID. For example, the RAN 110 may select the RAN slice based on the modified SPID so that the RAN slice may correlate with the one or more core network slices of the core network 115 being utilized to provide the service. The RAN 110 may utilize the modified SPID to identify the core network slice(s) of the core network 115 and may select the RAN slice to match the identified core network slice(s). In this way, the RAN 110 may provide the service to the user device 105 at the particular QCI. In some implementations, the modified SPID may cause the RAN 110 to handle a traffic flow (e.g., associated with the application) from the user device 105 with the RAN slice and to release the RAN slice when an application with the user device 105 is terminated.

As shown at steps 12 and 13 of FIG. 1F, the UDR may provide a notification of the SPID modification to the PCRF, and the PCRF may acknowledge receipt of the notification of the SPID modification. As shown at steps 14 and 15 of FIG. 1F, the PCRF may provide an indication of a policy update to the AMF, and the AMF may acknowledge receipt of the indication of the policy update. As shown at steps 16 and 17 and FIG. 1F, the AMF may provide a UD context modification request to the RAN 110, and the RAN 110 may provide a UD context modification response to the AMF based on the UD context modification request.

As shown in FIG. 1G, the SCEF 120 may determine that the SPID validity timer period (e.g., for the modified SPID) has expired. As shown at steps 1 and 2 of FIG. 1G, the SCEF 120 may provide a request to delete the modified SPID to the UDR, and the UDR may acknowledge the request to delete the modified SPID. As shown at step 3 of FIG. 1G, the UDR may provide the request to delete the modified SPID to the HSS. The HSS may generate an IDR based on the request to delete the modified SPID. As shown at step 4 of FIG. 1G, the HSS may provide the IDR to the MME. The MME may generate an IDA (e.g., with subscription data) based on the IDR. As shown at step 5 of FIG. 1G, the MME may provide the IDA to the HSS.

The MME may generate a UD context modification request, requesting deletion of the modified SPID, based on the IDR. As shown at step 6 of FIG. 1G, the MME may provide the UD context modification request to the RAN 110. The RAN 110 may generate a UD context modification response based on the UD context modification request. As shown at step 7 of FIG. 1G, the RAN 110 may provide the UD context modification response to the MME. The UD context modification response may indicate that the RAN 110 is deleting the modified SPID. As shown at step 8 of FIG. 1G, the HSS may provide, to the UDR, a notification acknowledging deletion of the modified SPID. As shown at steps 9 and 10 of FIG. 1G, the UDR may provide, to the PCRF, a notification acknowledging deletion of the modified SPID, and the PCRF may acknowledge receipt of the notification. As shown at steps 11 and 12 of FIG. 1G, the PCRF may provide an indication of a policy update to the AMF, and the AMF may acknowledge receipt of the indication of the policy update. As shown at steps 13 and 14 and FIG. 1G, the AMF may provide a UD context modification request to the RAN 110, and the RAN 110 may provide a UD context modification response to the AMF based on the UD context modification request.

Figure 1H:
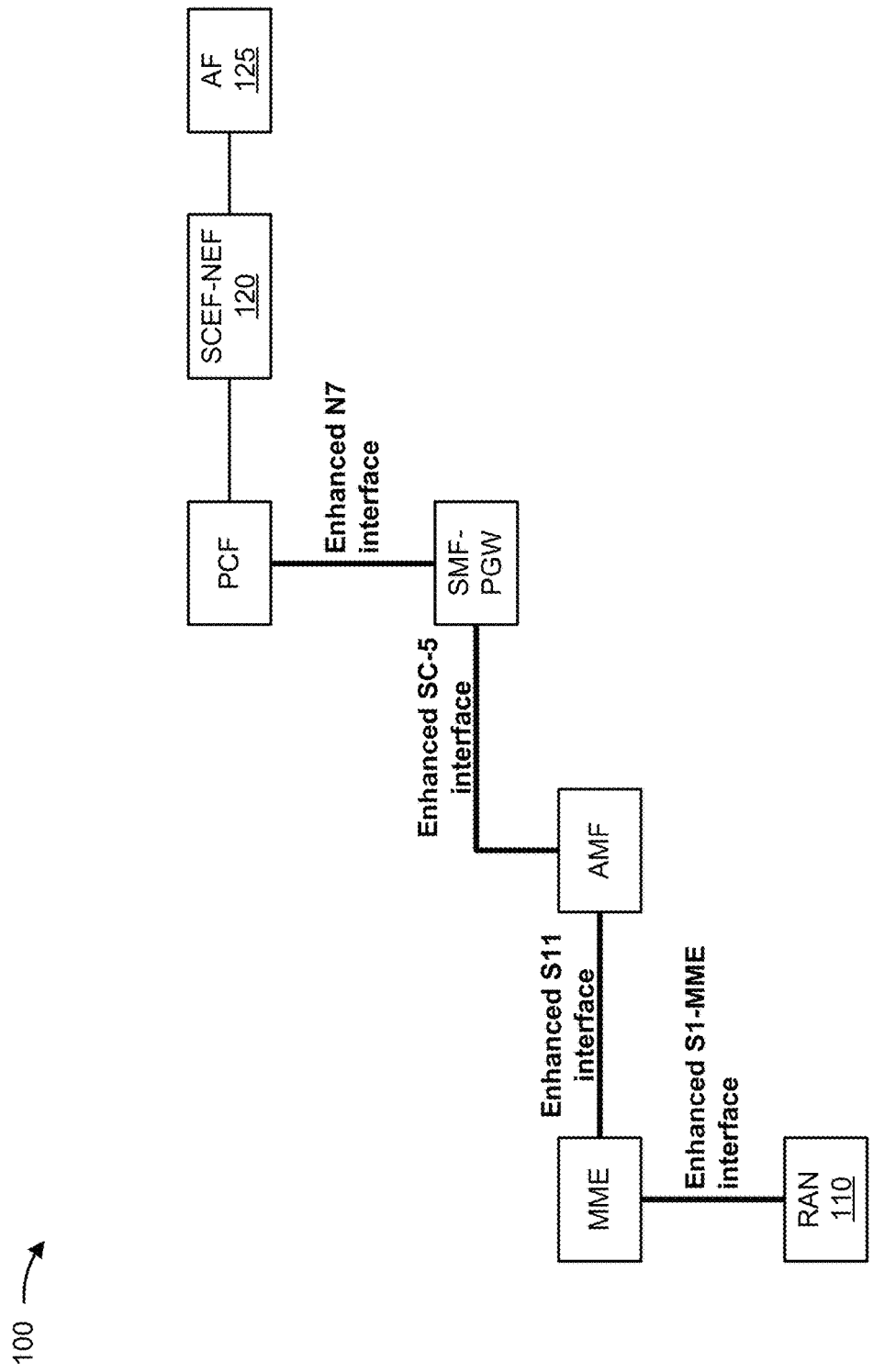

FIG. 1H depicts interfaces that may be enhanced or modified so that the SPID may be communicated to the RAN 110. For example, as shown in FIG. 1H, the N7 interface between the PCF and the SMF-PGW may be enhanced or modified, the SC-5 interface between the SMF-PGW and the AMF may be enhanced or modified, the S11 interface between the AMF and the MME may be enhanced or modified, the S1-MME interface between the MME and the RAN 110 may be enhanced or modified, and/or the like.

In this way, the SCEF-NEF 120 provides on-demand QoS with RAN 110 control. For example, the SCEF-NEF 120 may enable a linkage between core network 115 slices and RAN 110 slices so that a particular QoS (e.g., a QCI) may be applied to a service provided to the user device 105. The SCEF-NEF 120 may enable the linkage between the core network 115 slices and the RAN 110 slices in real time or near-real time and without modifying existing signal procedures between the core network 115 and the RAN 110. The SCEF-NEF 120 may provide, to the RAN 110, information identifying core network 115 slices, and SPIDs and QCIs associated with the core network 115 slices, so that the RAN 110 may map the RAN 110 slices to the core network 115 slices. The RAN 110 may process user device 105 traffic flows, with a SPID, on-demand, and may release RAN 110 resources as soon as a session is terminated for the traffic flows. Thus, the SCEF-NEF 120 may conserve computing resources, networking resources, and/or other resources associated with providing a poor QoS for the user device 105, inefficiently utilizing RAN 110 resources to provide a service to the user device 105, inefficiently utilizing core network 115 slices to provide a service to the user device 105, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
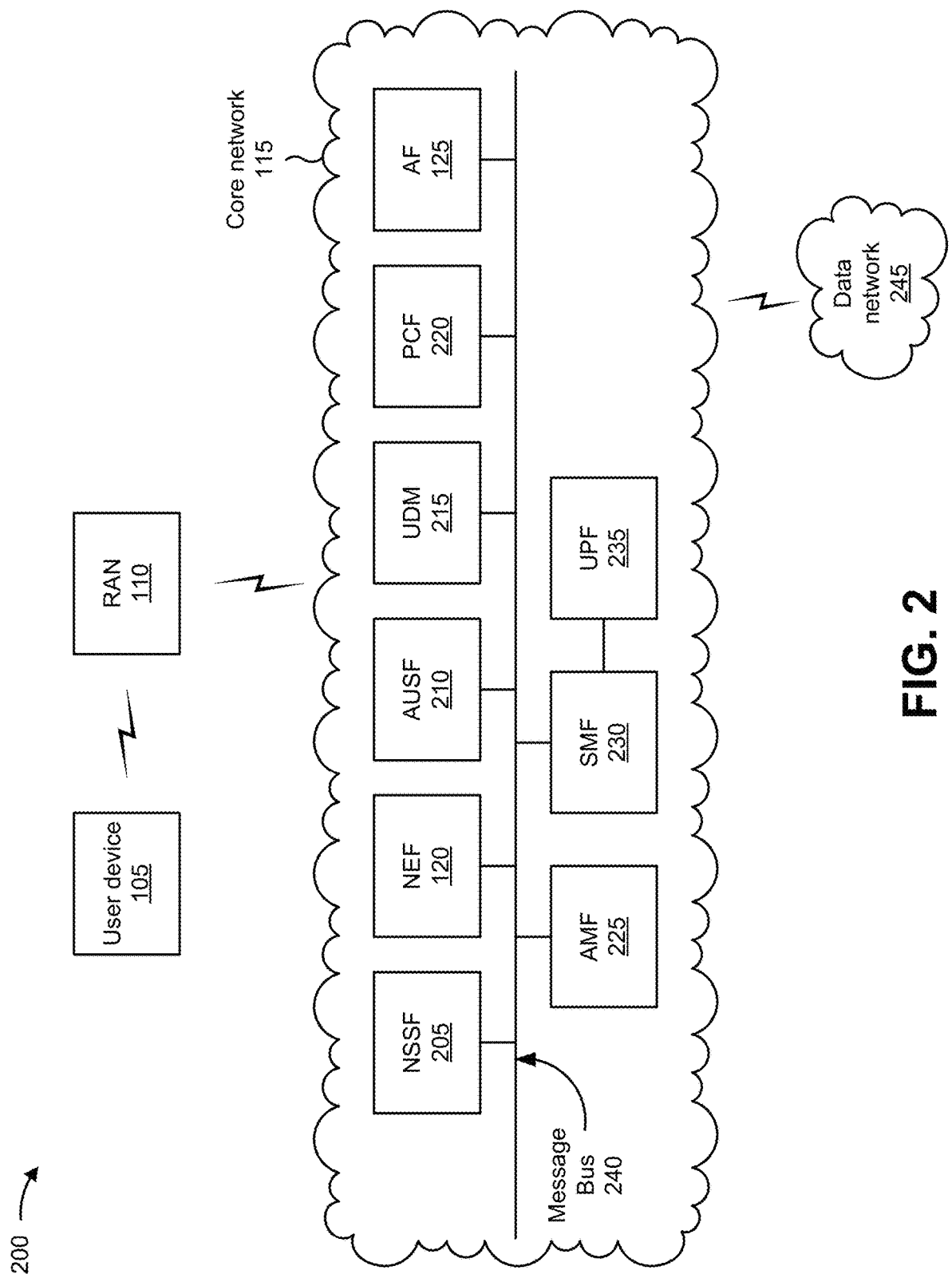
FIGS. 2 and 3 are diagrams of example environments in which systems and/or methods described herein may be implemented.

FIG. 2 is a diagram of an example environment 200 in which systems and/or methods described herein may be implemented. As shown in FIG. 2, the example environment 200 may include the user device 105, the RAN 110, the core network 115, and a data network 245. Devices and/or networks of the example environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, the NEF 120, an authentication server function (AUSF) 210, a unified data management (UDM) component 215, a policy control function (PCF) 220, the AF 125, an access and mobility management function (AMF) 225, a session management function (SMF) 230, and/or a user plane function (UPF) 235. These functional elements may be communicatively connected via a message bus 240. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 105. By providing network slicing, the NSSF 205 allows an operator to deploy multiple substantially independent end-to-end networks potentially with the same infrastructure. In some implementations, each slice may be customized for different services.

The NEF 120 includes one or more devices that support exposure of capabilities and/or events in the wireless telecommunications system to help other entities in the wireless telecommunications system discover network services.

The AUSF 210 includes one or more devices that act as an authentication server and support the process of authenticating the user device 105 in the wireless telecommunications system.

The UDM 215 includes one or more devices that store user data and profiles in the wireless telecommunications system. The UDM 215 may be used for fixed access and/or mobile access in the core network 115.

The PCF 220 includes one or more devices that provide a policy framework that incorporates network slicing, roaming, packet processing, and/or mobility management, among other examples.

The AF 125 includes one or more devices that support application influence on traffic routing, access to the NEF 120, and/or policy control, among other examples.

The AMF 225 includes one or more devices that act as a termination point for non-access stratum (NAS) signaling and/or mobility management, among other examples.

The SMF 230 includes one or more devices that support the establishment, modification, and release of communication sessions in the wireless telecommunications system. For example, the SMF 230 may configure traffic steering policies at the UPF 235 and/or may enforce user equipment IP address allocation and policies, among other examples.

The UPF 235 includes one or more devices that serve as an anchor point for intraRAT and/or interRAT mobility. The UPF 235 may apply rules to packets, such as rules pertaining to packet routing, traffic reporting, and/or handling user plane QoS, among other examples.

The message bus 240 represents a communication structure for communication among the functional elements. In other words, the message bus 240 may permit communication between two or more functional elements.

The data network 245 includes one or more wired and/or wireless data networks. For example, the data network 245 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
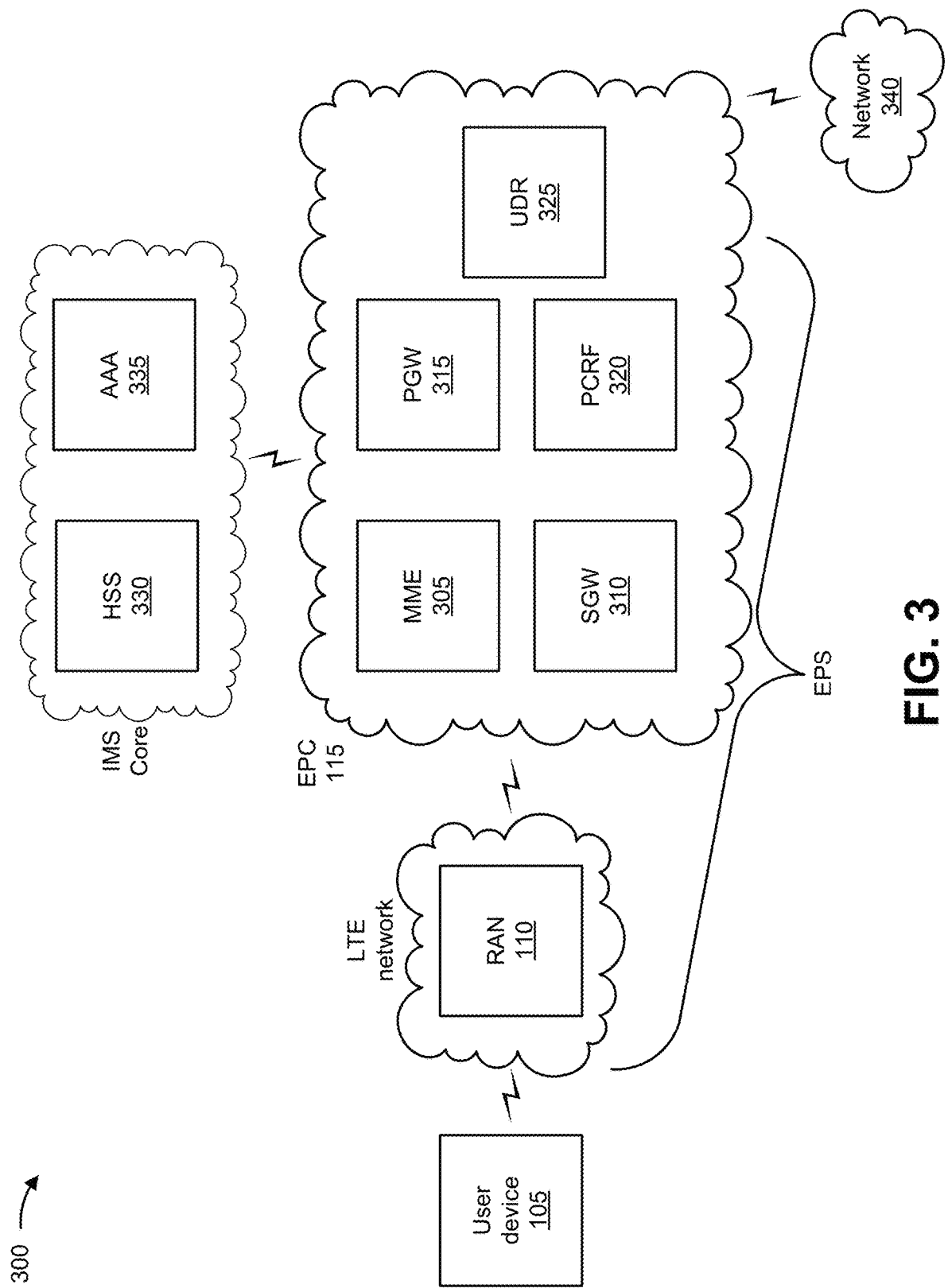

FIG. 3 is a diagram of an example environment 300 in which systems and/or methods, described herein, may be implemented. As shown in FIG. 3, the environment 300 may include the user device 105, the RAN 110, a mobility management entity device (MME) 305, a serving gateway (SGW) 310, a packet data network gateway (PGW) 315, a policy and charging rules function (PCRF) 320, a uniform data repository (UDR) 325, a home subscriber server (HSS) 330, an authentication, authorization, and accounting server (AAA) 335, and a network 340. Devices of the environment 300 may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a third generation (3G) network or a 5G network.

The environment 300 may include an evolved packet system (EPS) that includes an LTE network and/or an evolved packet core (EPC) (e.g., the core network 115) that operate based on a third-generation partnership project (3GPP) wireless communication standard. The LTE network may include a RAN that includes one or more RANs 110 that take the form of evolved Node Bs (eNBs) via which the user device 105 communicates with the EPC 115. The EPC 115 may include the MME 305, the SGW 310, the PGW 315, the PCRF 320, and/or the UDR 325 to enable the user device 105 to communicate with the network 340 and/or an Internet protocol (IP) multimedia subsystem (IMS) core. The IMS core may include the HSS 330 and/or the AAA 335, and may manage device registration and authentication, session initiation, and/or other operations associated with user devices 105. The HSS 330 and/or the AAA 335 may reside in the EPC 115 and/or the IMS core.

The MME 305 includes one or more devices, such as one or more server devices, capable of managing authentication, activation, deactivation, and/or mobility functions associated with the user device 105. In some implementations, the MME 305 may perform operations relating to authentication of the user device 105. Additionally, or alternatively, the MME 305 may facilitate the selection of a particular SGW 310 and/or a particular PGW 315 to provide traffic to and/or from the user device 105. The MME 305 may perform operations associated with handing off the user device 105 from a first RAN 110 to a second RAN 110 when the user device 105 is transitioning from a first cell associated with the first RAN 110 to a second cell associated with the second RAN 110. Additionally, or alternatively, the MME 305 may select another MME (not pictured), to which the user device 105 should be handed off (e.g., when the user device 105 moves out of range of the MME 305).

The SGW 310 includes one or more devices capable of routing packets. For example, the SGW 310 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, the SGW 310 may aggregate traffic received from one or more RANs 110 associated with the LTE network, and may send the aggregated traffic to the network 340 (e.g., via the PGW 315) and/or other network devices associated with the EPC 115 and/or the IMS core. The SGW 310 may receive traffic from the network 340 and/or other network devices, and may send the received traffic to the user device 105 via the RAN 110. Additionally, or alternatively, the SGW 310 may perform operations associated with handing off the user device 105 to and/or from an LTE network.

The PGW 315 includes one or more devices capable of providing connectivity for the user device 105 to external packet data networks (e.g., other than the depicted EPC 115 and/or the LTE network). For example, the PGW 315 may include one or more data processing and/or traffic transfer devices, such as a gateway, a router, a modem, a switch, a firewall, a MC, a hub, a bridge, a server device, an OADM, or any other type of device that processes and/or transfers traffic. In some implementations, the PGW 315 may aggregate traffic received from one or more SGWs 310, and may send the aggregated traffic to the network 340. Additionally, or alternatively, the PGW 315 may receive traffic from the network 340, and may send the traffic to the user device 105 via the SGW 310 and the RAN 110. The PGW 315 may record data usage information (e.g., byte usage), and may provide the data usage information to the AAA 335.

The PCRF 320 includes one or more devices, such as one or more server devices, capable of providing policy control decision and flow-based charging control functionalities. For example, the PCRF 320 may provide network control regarding service data flow detection, gating, and/or quality of service (QoS) and flow-based charging, among other examples. In some implementations, the PCRF 320 may determine how a certain service data flow is to be treated, and may ensure that user plane traffic mapping and treatment is in accordance with a user subscription profile.

The UDR 325 includes one or more devices, such as one or more server devices, data structures, and/or the like. For example, the UDR 325 may provide a converged repository of subscriber information that can be used to service a number of network functions.

The HSS 330 includes one or more devices, such as one or more server devices, capable of managing (e.g., receiving, generating, storing, processing, and/or providing) information associated with the user device 105. For example, the HSS 330 may manage subscription information associated with the user device 105, such as information that identifies a subscriber profile of a user associated with the user device 105, information that identifies services and/or applications that are accessible to the user device 105, location information associated with the user device 105, a network identifier (e.g., a network address) that identifies the user device 105, information that identifies a treatment of the user device 105 (e.g., quality of service information, a quantity of minutes allowed per time period, a quantity of data consumption allowed per time period, etc.), and/or similar information. The HSS 330 may provide this information to one or more other devices of the environment 300 to support the operations performed by those devices.

The AAA 335 includes one or more devices, such as one or more server devices, that perform authentication, authorization, and/or accounting operations for communication sessions associated with the user device 105. For example, the AAA 335 may perform authentication operations for the user device 105 and/or a user of the user device 105 (e.g., using one or more credentials), may control access, by the user device 105, to a service and/or an application (e.g., based on one or more restrictions, such as time-of-day restrictions, location restrictions, single or multiple access restrictions, read/write restrictions, etc.), may track resources consumed by the user device 105 (e.g., a quantity of voice minutes consumed, a quantity of data consumed, etc.), and/or may perform similar operations.

The network 340 includes one or more wired and/or wireless networks. For example, the network 340 may include a cellular network (e.g., a 5G network, an LTE network, a 3G network, a code division multiple access (CDMA) network, etc.), a PLMN, a LAN, a WAN, a MAN, a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

FIG. 4 is a diagram of example components of a device 400, which may correspond to the user device 105, the RAN 110, the NEF 120, the AF 125, the NSSF 205, the AUSF 210, the UDM 215, the PCF 220, the AMF 225, the SMF 230, the UPF 235, the MME 305, the SGW 310, the PGW 315, the PCRF 320, the UDR 325, the HSS 330, and/or the AAA 335. In some implementations, the user device 105, the RAN 110, the NEF 120, the AF 125, the NSSF 205, the AUSF 210, the UDM 215, the PCF 220, the AMF 225, the SMF 230, the UPF 235, the MME 305, the SGW 310, the PGW 315, the PCRF 320, the UDR 325, the HSS 330, and/or the AAA 335 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. Memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for providing on-demand QoS with RAN control. In some implementations, one or more process blocks of FIG. 5 may be performed by a network device (e.g., the SCEF-NEF 120). In some implementations, one or more process blocks of FIG. 5 may be performed by another device or a group of devices separate from or including the network device, such as a RAN (e.g., the RAN 110) and/or an AF (e.g., the AF 125). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include maintaining a mapping table that maps core network slices with quality of service (QoS) class identifiers (QCIs) based on service profile identifiers (SPIDs) (block 510). For example, the network device may maintain a mapping table that maps core network slices with QCIs based on SPIDs, as described above. In some implementations, the mapping table includes one or more of a service profile field with plurality of service profile entries, a NSSAI field with a plurality of NSSAI entries, a SPID field with a plurality of SPID entries, a QCI field with a plurality of QCI entries, or a pricing field with a plurality of price entries. In some implementations, the network device is one of a service capabilities exposure function, when the core network is a fourth generation network, or a network exposure function when the core network a fifth generation network. In some implementations, receiving the request for the service with the particular QCI includes receiving the request for the service with the particular QCI from an application function and a user plane function of the core network.

As further shown in FIG. 5, process 500 may include receiving, from a user device, a request for service with a particular QCI included in the QCIs of the mapping table (block 520). For example, the network device may receive, from a user device, a request for service with a particular QCI included in the QCIs of the mapping table, as described above.

As further shown in FIG. 5, process 500 may include identifying a particular SPID of the SPIDs in the mapping table based on the particular QCI of the service (block 530). For example, the network device may identify a particular SPID of the SPIDs in the mapping table based on the particular QCI of the service, as described above.

As further shown in FIG. 5, process 500 may include generating a flow request based on the particular SPID (block 540). For example, the network device may generate a flow request based on the particular SPID, as described above. In some implementations, generating the flow request based on the particular SPID includes generating the flow request that includes an identifier of the user device, the particular SPID, an identifier of the service, and the particular QCI of the service. In some implementations, when the core network is a 4G network, the flow request includes a create bearer request message that includes data identifying one or more of the particular SPID, an identifier of the user device, a procedure transaction identity, the particular QCI of the service, a maximum packet loss rate for uplink and downlink traffic, a traffic flow template, a linked evolved packet system bearer identity, or protocoling configuration options.

As further shown in FIG. 5, process 500 may include causing the flow request to be provided to a radio access network (RAN) associated with the user device, to cause the RAN to select a RAN slice for provision of the service to the user device (block 550). For example, the network device may cause the flow request to be provided to a radio access network (RAN) associated with the user device, to cause the RAN to select a RAN slice for provision of the service to the user device, as described above. In some implementations, the RAN selects the RAN slice based on the particular SPID provided in the flow request. In some implementations, the flow request causes the RAN to handle a traffic flow from the user device with the RAN slice and to release the RAN slice when a session with the user device is terminated. In some implementations, causing the flow request to be provided to the RAN includes causing the flow request to be provided to the RAN via a policy control function and an access and mobility management function of the core network. In some implementations, causing the flow request to be provided to the RAN includes causing the flow request to be provided to the RAN via a mobility management entity device, a serving gateway, a packet data network gateway, a policy and charging rules function of the core network.

In some implementations, process 500 includes receiving, from the user device, another request for another service with another QCI, generating a modified SPID based on the other QCI of the other request and based on the mapping table, maintaining a validity time period for the modified SPID, and causing the modified SPID to be provided to the RAN of the user device for a duration of the validity time period. In some implementations, the modified SPID causes the RAN to select another RAN slice for provision of the other service to the user device. In some implementations, process 500 includes determining that the duration of the validity time period has expired after causing the modified SPID to be provided to the RAN, and causing the modified SPID to be removed from the RAN based on expiration of the duration of the validity time period.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   maintaining a mapping table that maps core network slices with quality of service (QoS) class identifiers (QCIs) based on service profile identifiers (SPIDs);
   receiving, by a network device of a core network and from a user device, a request for a service with a particular QCI included in the QCIs of the mapping table;
   identifying, by the network device, a particular SPID of the SPIDs in the mapping table based on the particular QCI of the service;
   generating, by the network device, a flow request based on the particular SPID; and
   causing, by the network device, the flow request to be provided to a radio access network (RAN) associated with the user device, to cause the RAN to select a RAN slice for provision of the service to the user device.

2. The method of claim 1, wherein the RAN selects the RAN slice based on the particular SPID provided in the flow request.

3. The method of claim 1, wherein the mapping table includes one or more of:
   a service profile field with plurality of service profile entries,
   a network slice selection assistance information (NSSAI) field with a plurality of NSSAI entries,
   a SPID field with a plurality of SPID entries,
   a QCI field with a plurality of QCI entries, or
   a pricing field with a plurality of price entries.

4. The method of claim 1, wherein the network device is one of a service capabilities exposure function, when the core network is a fourth generation network, or a network exposure function when the core network a fifth generation network.

5. The method of claim 1, wherein generating the flow request based on the particular SPID comprises:
   generating the flow request that includes an identifier of the user device, the particular SPID, an identifier of the service, and the particular QCI of the service.

6. The method of claim 1, wherein, when the core network is a fourth generation network, the flow request includes a create bearer request message that includes data identifying one or more of:
   the particular SPID,
   an identifier of the user device,
   a procedure transaction identity,
   the particular QCI of the service,
   a maximum packet loss rate for uplink and downlink traffic,
   a traffic flow template,
   a linked evolved packet system bearer identity, or
   protocol configuration options.

7. The method of claim 1, wherein the flow request causes the RAN to handle a traffic flow from the user device with the RAN slice and to release the RAN slice when a session with the user device is terminated.

8. A network device, comprising:
   one or more memories; and
   one or more processors configured to:
      maintain a mapping table that maps core network slices with quality of service (QoS) class identifiers (QCIs) based on service profile identifiers (SPIDs);

receive, from a user device, a request for a service with a particular QCI included in the QCIs of the mapping table;

identify a particular SPID of the SPIDs in the mapping table based on the particular QCI of the service;

generate a flow request based on the particular SPID; and cause the flow request to be provided to a radio access network (RAN) associated with the user device, wherein the flow request causes the RAN to:
- select a RAN slice for provision of the service to the user device,
- handle a traffic flow from the user device with the RAN slice, and
- release the RAN slice when a session with the user device is terminated.

9. The network device of claim 8, wherein the one or more processors are further configured to:

receive, from the user device, another request for another service with another QCI;

generate a modified SPID based on the other QCI of the other request and based on the mapping table;

maintain a validity time period for the modified SPID; and cause the modified SPID to be provided to the RAN of the user device for a duration of the validity time period.

10. The network device of claim 9, wherein the modified SPID causes the RAN to select another RAN slice for provision of the other service to the user device.

11. The network device of claim 9, wherein the one or more processors are further configured to:

determine that the duration of the validity time period has expired after causing the modified SPID to be provided to the RAN; and cause the modified SPID to be removed from the RAN based on expiration of the duration of the validity time period.

12. The network device of claim 8, wherein the one or more processors, to receive the request for the service with the particular QCI, are configured to:

receive the request for the service with the particular QCI from an application function and a user plane function of the core network.

13. The network device of claim 8, wherein the one or more processors, to cause the flow request to be provided to the RAN, are configured to:

cause the flow request to be provided to the RAN via a policy control function and an access and mobility management function of the core network.

14. The network device of claim 8, wherein the one or more processors, to cause the flow request to be provided to the RAN, are configured to:

cause the flow request to be provided to the RAN via a mobility management entity device, a serving gateway, a packet data network gateway, a policy and charging rules function of the core network.

15. A non-transitory computer-readable medium storing a set of instructions, the set of instructions comprising:

one or more instructions that, when executed by one or more processors of a network device, cause the network device to:

maintain a mapping table that maps core network slices with quality of service (QoS) class identifiers (QCIs) based on service profile identifiers (SPIDs);

receive, from a user device, a request for a service with a particular QCI included in the QCIs of the mapping table;

identify a particular SPID of the SPIDs in the mapping table based on the particular QCI of the service;

generate a flow request based on the particular SPID, wherein the flow request includes an identifier of the user device, the particular SPID, an identifier of the service, and the particular QCI of the service; and cause the flow request to be provided to a radio access network (RAN) associated with the user device, to cause the RAN to select a RAN slice for provision of the service to the user device.

16. The non-transitory computer-readable medium of claim 15, wherein the one or more instructions further cause the network device to:

receive, from the user device, another request for another service with another QCI;

generate a modified SPID based on the other QCI of the other request;

maintain a validity time period for the modified SPID;

cause the modified SPID to be provided to the RAN of the user device for a duration of the validity time period;

determine that the duration of the validity time period has expired after causing the modified SPID to be provided to the RAN; and cause the modified SPID to be removed from the RAN based on expiration of the duration of the validity time period.

17. The non-transitory computer-readable medium of claim 16, wherein the modified SPID causes the RAN to select another RAN slice for provision of the other service to the user device.

18. The non-transitory computer-readable medium of claim 15, wherein the one or more instructions, that cause the network device to receive the request for the service with the particular QCI, cause the network device to:

receive the request for the service with the particular QCI from an application function and a user plane function of the core network.

19. The non-transitory computer-readable medium of claim 15, wherein the one or more instructions, that cause the network device to cause the flow request to be provided to the RAN, cause the network device to:

cause the flow request to be provided to the RAN via a policy control function and an access and mobility management function of the core network.

20. The non-transitory computer-readable medium of claim 15, wherein the one or more instructions, that cause the network device to cause the flow request to be provided to the RAN, cause the network device to:

cause the flow request to be provided to the RAN via a mobility management entity device, a serving gateway, a packet data network gateway, a policy and charging rules function of the core network.

\* \* \* \* \*